July 17, 1962 G. VAN MECHELEN 3,045,186

ASSOCIATED CIRCUIT FOR ELECTRICAL COMPARATOR

Filed April 14, 1959 2 Sheets-Sheet 1

INVENTOR
G. VAN MECHELEN

BY Robert Lieber

ATTORNEY

ASSOCIATED CIRCUIT FOR ELECTRICAL COMPARATOR
Filed April 14, 1959 2 Sheets-Sheet 2
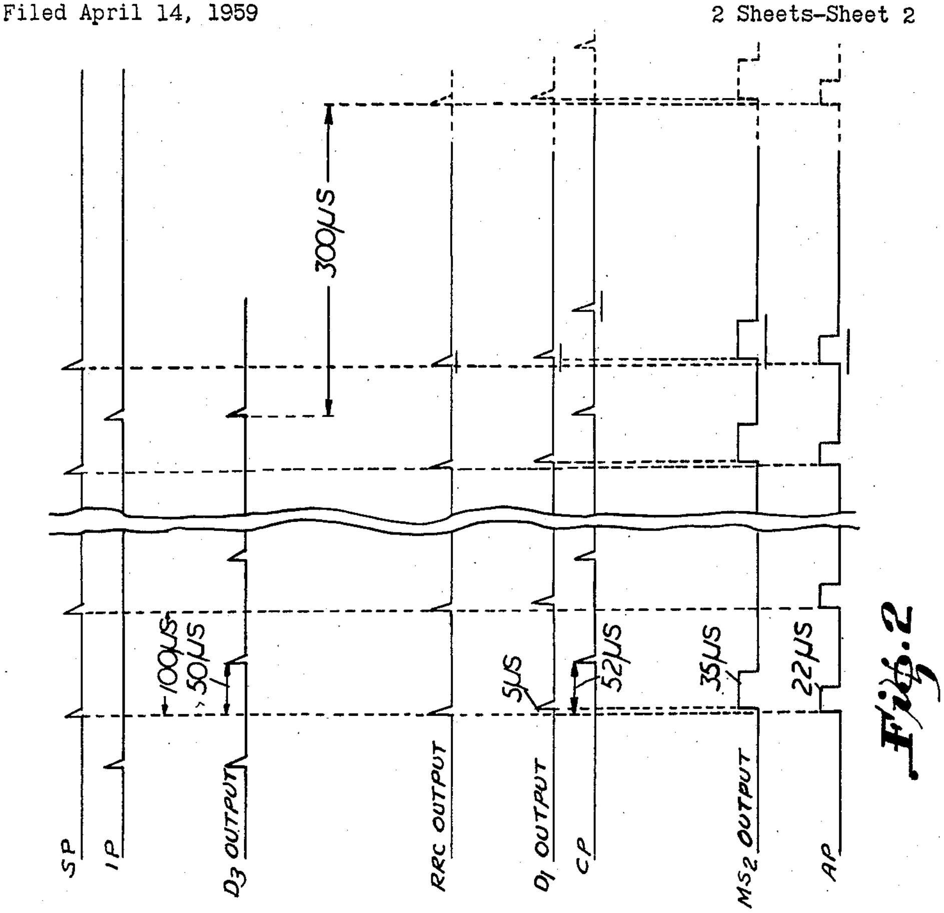
Fig. 2
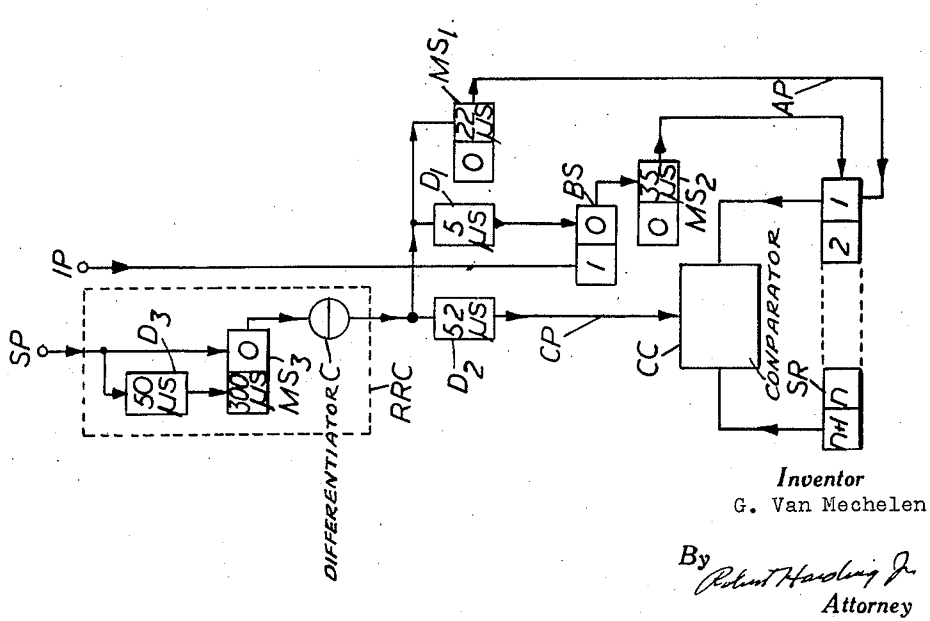
Inventor
G. Van Mechelen
By Robert Harding Jr.
Attorney

United States Patent Office 3,045,186

Patented July 17, 1962

3,045,186

ASSOCIATED CIRCUIT FOR ELECTRICAL COMPARATOR

Guillaume Van Mechelen, Antwerp, Belgium, assignor to International Standard Electric Corporation, New York, N.Y., a corporation of Delaware Filed Apr. 14, 1959, Ser. No. 806,363

3 Claims. (Cl. 328—55)

Figure 1:
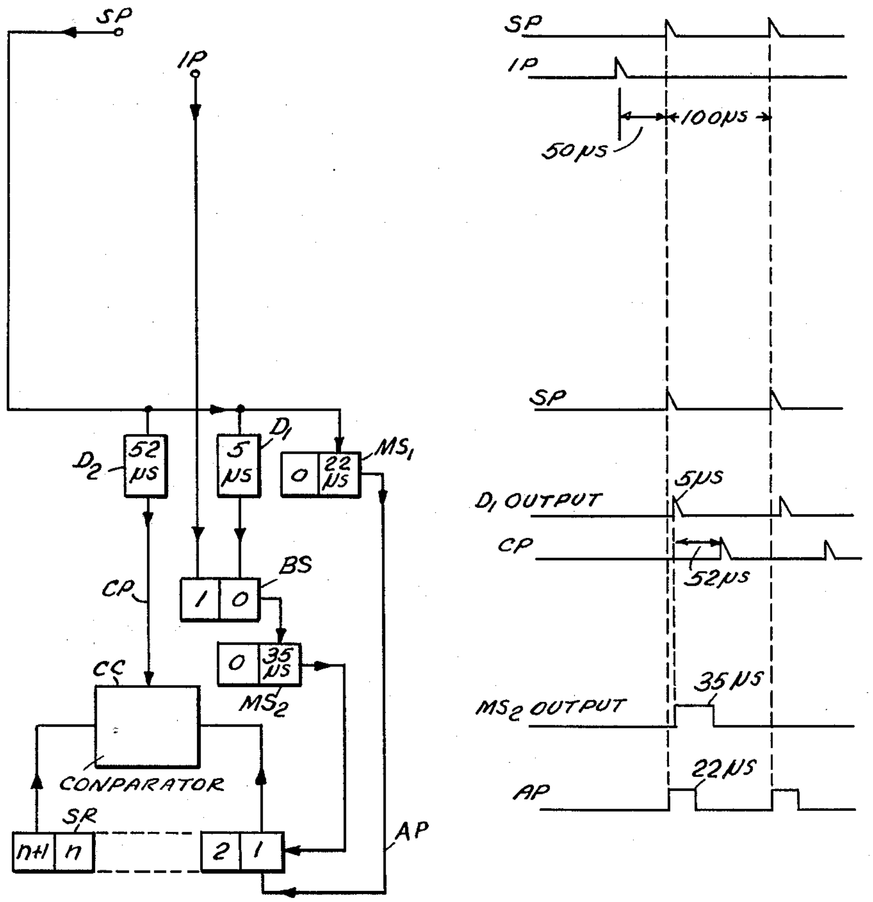

The invention relates to an associated circuit arrangement to be used with an electrical comparator, and more particularly to a comparator for the serial comparison of two numbers, each electrically represented by means of *n* binary digits, comprising an $n+1$ stage pattern shift register, a binary digit comparator fed from the first and the last stages of said register for successively comparing the digits of a first number recorded on the first *n* stages of said register with like digits of a second number serially inserted, digit by digit, on said register as the first number is turned out of said register and this by means of a train of information pulses which characterize the binary digits of said second number by their presence or absence respectively, interleaved with a train of synchronizing pulses, said synchronizing pulses being adapted to drive said register and to generate a train of delayed comparison pulses which are used to scan said single binary digit comparator.

Such a comparator is known from the U.S. patent application, Serial No. 636,630, filed January 28, 1957, now Patent No. 2,977,574. If the synchronizing pulses lead the corresponding information pulses, the first synchronizing pulse will be able to shift the first number initially stored in the register by one stage so that the first stage of the register will be ready to store the first binary digit of the second number which will be characterized by a pulse or the absence thereof. With such an arrangement however, the phase relation between the synchronizing pulses and the information pulses should be rather well determined and it may, for example, be chosen as half the period of the synchronizing pulses. In such a case, the comparison pulses which are derived from the synchronizing pulses should be delayed with respect to the latter by a time which is sufficient to cause them to appear after the first stage of the register has been set in the condition corresponding to the first digit of the second number. On the other hand, this delay should be less than the period of the synchronizing pulses since the comparison pulse must scan the comparator before the second synchronizing pulse has been able to generate an advancing pulse to shift the pattern on the register. In systems where the phase relation between the synchronizing pulses is not absolutely fixed, such as that discussed in the above mentioned U.S. patent application, and bearing in mind that the delay of the comparison pulses behind the synchronizing pulses will generally be obtained with the help of a monostable circuit which has a certain tolerance, it is clear that it will be difficult to ensure the desired sequence of events.

It was therefore proposed in the above U.S. patent application to add an extra stage to the shift register and to have the information pulses lead the synchronizing pulses, in which case it is merely necessary that the comparison pulse should appear after the advancing pulse, also generated by the synchronizing pulse, has shifted the first digit of the second number from the first extra stage of the register to the second stage, the upper limit of the delay of the comparison pulse behind the synchronizing pulse being again equal to one period. In this way, considerable phase shifts between the information and the synchronizing pulses may be tolerated. More precisely, the lead of the information pulses in front of the synchronizing pulses may extend from zero to a value equal to the period of the synchronizing pulses minus the duration of the advancing pulses generated therefrom, this to avoid that an information pulse should reach the first stage of the register during the time an advancing pulse drives the pattern.

This extra stage for the shift register must however be in a well defined condition before the operations are started, in order that the first digit of the second number, characterised by a pulse or the absence thereof, may be unambiguously registered. This means that the shift register must be initially reset, for example, by sending at least one advancing pulse which will take care that the first extra stage of the register putting it initially in the zero condition. Yet, for the purpose of making the serial comparison there is no strict need for a reset of the shift register which would therefore have to be made solely for the purpose of insuring the well defined condition for said first extra stage. Further, in some applications it may be necessary to recirculate the number stored in the register. Obviously, the extra input stage should not be included in the recirculating loop which means that separate input and output circuits for this extra stage of the register will be needed. This output circuit for the first stage will also have to be adapted as a mixer circuit to receive the pulses recirculated from the end of the register. Moreover, a useful way of recirculating a number started in the register is to connect the output of the last stage thereof to the input of a monostable circuit which can deliver a pulse of suitable duration to the gate which permits the closing of the recirculating loop. Such a monostable circuit would also have to be provided at the output of the extra input stage of the register. Also, in some applications it may be required that the incoming number is serially fed either to a first or to a second shift register in order to be compared with either of the corresponding numbers already stored in said two registers. In such a case, the advancing pulses must be fed either to one or the other register but in both cases to the extra input stage of the registers unless it is duplicated for both registers. This implies the use of a mixer gate for the advancing pulses to be fed to the extra input stage, which for some types of shift registers it is preferable to avoid, e.g. in cold cathode tube registers of the type disclosed in U.S. Patent No. 2,649,502 since appreciable voltages are needed for the advancing pulses. Alternatively, a separate generator of advancing pulses for the extra input stage may be provided, but this is evidently just as costly as the duplication of the extra input stage. Therefore, on the whole, this extra stage for the shift register which has nothing to do with the actual function of the register which is to record the digits of the numbers, but which is merely due to the desire to have the information pulses in front of the synchronizing pulses, introduces some complications.

Moreover, the allowable phase shift between the information pulses and the synchronizing pulses is still limited to less than a period by the duration of the advancing pulses. As the frequency of operation increases, and particularly for shift registers of the type disclosed in the above mentioned U.S. Patent No. 2,649,502, the duration of the advancing pulses will constitute an important fraction of their period. The phase margin can be increased up to a full period by increasing the length of the information pulses which are normally short trigger pulses, but then, an additional monostable device is required and one must take care that the comparison pulses do not occur during the time this last monostable device is triggered.

An object of the invention is to provide simple input means for a shift register used for serial comparison and which input means can readily deal with the fact that the information pulses lead the synchronizing pulses.

Another object of the invention is to provide simple input means to the shift register which allow variations in the phase shift between the information and the synchronizing pulses up to a full period of the latter.

In accordance with a first characteristic of the invention, for an electrical comparator of the type defined at the beginning of this description, a two-condition device having at least one stable condition and a monostable device are provided. The former being triggered from the first stable condition to the second condition by an information pulse and from the second to the first stable condition by a synchronizing pulse which last triggering sets said monostable device to its unstable condition to create an activating pulse. This activating pulse lasts sufficiently long to permit the activation of said first stage after said synchronizing pulse has caused said first number stored on said register to advance by one step and before the comparison pulse delayed from said synchronizing pulse has reached said single binary digit comparator.

In some applications, despite preference for having the information pulses in front of the synchronizing pulses, the reverse condition may be unavoidable. Such will be the case for instance if the information is to be fed in one or the other direction.

Another object of the invention is to provide additional simple input means to the shift register which can delay the synchronizing pulses so that they are made to lag behind the information pulses, in such a manner that phase shifts up to a full period between the information and the synchronizing pulses can still be tolerated, while the system is still substantially independent of the frequency of the synchronizing pulses.

In accordance with another characteristic of the invention, the synchronizing pulses are applied to input means to the register, said input means being adapted to deal with synchronizing pulses leading the information pulses, through a circuit comprising a further monostable device triggered to its unstable condition by said synchronizing pulses applied through a delay circuit and restored to its stable condition by the undelayed synchronizing pulses, said further monostable device, being restored to its stable condition, thus creating output synchronizing pulses which lag behind the information pulses.

The above mentioned and other objects and characteristics of the invention and the manner of attaining them will be best understood from the following description of a detailed embodiment to be read in conjunction with the appended drawings, in FIGS. 1 and 2, which represent alternative electronic logical circuit arrangements in accordance with the invention together with various pulse wave forms appearing in the circuits.

It will be first assumed that the eventual information pulses characterizing a binary digit by their presence or absence respectively, and applied at terminal IP lead the synchronizing pulses applied at terminal SP by a half period, the synchronizing pulses being shown as 100 microseconds apart. For such a predetermined phase relation between the information and the synchronizing pulses the network RRC between terminal SP and the input of the monostable circuit $MS_1$, in FIG. 2, is replaced by a short-circuit and FIG. 1 is applicable.

It will be assumed that the shift register SR already contains a first number of $n$ binary digits registered on its stages 1 to $n$. This shift register may be of the type disclosed in the above mentioned U.S. Patent No. 2,649,502. Input to its first stage occurs through the output of the monostable device $MS_2$ which has a natural time constant of 35 microseconds. The outputs of the first and the $(n+1)$th stages of SR lead to the comparator CC so that after the first advancing pulse at terminal AP has shifted the first number on SR by one stage, and the first digit of the second number has been registered on stage 1 of SR, this first digit of the second number is then compared with the first digit of the first number. The comparator CC is not detailed since it is fully shown in the U.S. patent application No. 636,630 already referred to. Apart from the comparison gates, it may contain at least one bistable device which will be triggered to one or the other condition to indicate which number is the highest. This triggering through the comparator gates will conveniently be done by way of sharp comparison pulses which appear at terminal CP, and lag by 52 microseconds behind the pulses reaching the input of the monostable device $MS_1$, due to the delay circuit $D_2$.

The bistable device BS will be intially reset to the zero condition by means of a reset trigger pulse.

Assuming that the first binary digit of the second number to be fed by the register SR is that characterised by an information pulse at terminal IP, BS will therefore be triggered to its condition. This triggering will be without outside effects, but upon the following synchronizing pulse arriving at terminal SP, which will go through the delay circuit $D_1$ and 5 microseconds afterwards it will appear at the zero input of BS to trigger the latter back to its zero condition. This will generate an output pulse which will be suitably differentiated at the input of the monostable device $MS_2$ to trigger the latter into its unstable condition for 35 microseconds. At the same time, the synchronizing pulse will trigger the monostable device $MS_1$ to its unstable condition for 22 microseconds. This will cause an advancing pulse to be applied to SR to shift the first number by one stage but after the disappearance of this advancing pulse of 22 microseconds, the remaining part of the input pulse of 35 microseconds will still be able to trigger the first stage of SR in correspondence with the first digit of the second number which is characterised by an input pulse. On the other hand, if there is no information pulse, the pulse of 35 microseconds cannot be produced as BS has remained in its zero condition.

The delay circuit $D_1$ is useful to take care of spurious delays which might cause the pulse of 35 microseconds to eventually lead the advancing pulse of 22 microseconds, whereby the first stage of SR might be unduly triggered prior to the first advancing pulse having advanced the first number. These spurious delays in the parallel paths leading respectively to the zero input of BS and to the input of $MS_1$ may particularly occur if some gates (not shown) have to be inserted in these paths. With this delay of 5 microseconds one can positively insure that stage 1 of SR can only be triggered after the first number has been advanced by one step.

It will be recognized that the arrangement shown affords a very simple way of getting rid to an appreciable extent of the influence of phase shifts between the information and the synchronizing pulses, since all the pulses which are applied to the shift register SR and to the comparator CC are solely based on a single train of pulses, i.e. the synchronizing pulses, and no longer depend on the exact positions of the information pulses.

The latter may lead the synchronizing pulses by as much as a period minus the delay of $D_1$ and they may actually lag behind the synchronizing pulses by the amount of the delay provided by $D_1$. They will ensure that the synchronizing pulses cannot trigger BS before the latter is triggered by an eventual information pulse and also that two information pulses cannot consecutively reach the corresponding input of BS without being separated by a synchronizing pulse delayed by $D_1$ and restoring BS to its zero condition. The period of the synchronizing pulses represented as 100 microseconds can evidently be varied as long as it remains greater than the delay provided by $D_2$ which latter delay should be larger than the sum of the delay provided by $D_1$ plus the time constant of $MS_2$, which sum should in turn be larger than the time constant of $MS_1$. If the bistable device BS is replaced by a monostable device, its time constant should be chosen sufficiently large with respect to the largest possible period of the input synchronizing pulses so that the latter may always, through the delay device $D_1$, forcibly restore the monostable device to its stable condition.

If the input information must inevitably be supplied to the arrangement with the synchronizing pulses leading the information pulses, as shown in FIG. 2, the RRC circuit should then be used. The first leading synchronizing pulse will be without effect since it will tend to put the monostable device $MS_3$ into its stable condition which is already the condition of that device. But, after a delay of 50 microseconds provided by $D_3$, $MS_3$ will be triggered to its unstable condition for 300 microseconds. This triggering will be without outside effects. The eventual first information pulse will be admitted to the bistable device BS as previously described. The second synchronizing pulse will trigger $MS_3$ back to its stable condition and this will create a pulse which will be transformed into an actuating trigger pulse by the differentiator C. Thus, the conditions are exactly the same as for the first case and when an information pulse is present, $MS_2$ will deliver a pulse of 35 microseconds, whereas no such pulse will be delivered in the absence of an information pulse.

But, the first synchronizing pulse leading the information pulses has now been made ineffective.

Upon the last synchronizing pulse restoring $MS_3$ to its stable condition, there will therefore have been only $n-1$ synchronizing pulses and hence $n-1$ advancing pulses at terminal AP. Consequently, the underlined pulses will not be produced. the last $n$th advancing pulse at terminal AP will however, be locally produced by $MS_3$ which was set to its unstable condition 50 microseconds after the appearance of the last pulse at terminal SP, and which will therefore create a locally generated last advancing pulse upon being naturally restored to its stable condition after a time of 300 microseconds. Thus, a last advancing pulse together with an eventual pulse of 35 microseconds (shown in dotted lines) to be fed to the input of SR will be produced.

With circuit RRC the arrangement is still substantially independent of the frequency of operation. The period of the synchronizing pulses should be larger than the delay of 50 microseconds produced by $D_3$, while it should be smaller than the sum of this delay plus the time constant of 300 microseconds of $MS_3$. This will ensure that two successive pulses cannot try to restore $MS_3$ without a delayed pulse being applied to trigger $MS_3$ to its unstable condition, and also, that a synchronizing pulse can always restore $MS_3$ to its stable condition.

While the principles of the invention have been described above in connection with specific apparatus, it is to be clearly understood that this description is made only by way of example and not as a limitation on the scope of the invention.

I claim:

1. An electronic circuit arrangement for providing input means to an $N+1$ stage pattern shift register; to be used in conjunction with a binary digit comparator fed from the first and the last stages of said register for successively comparing the digits of a first number recorded on the first $n$ stages of said register with like digits of a second number serially inserted, digit by digit, on said register as the first number is turned out of said register; comprising a source of information pulses and a source of synchronizing pulses, means coupled to said synchronizing pulse source for deriving advancing pulses, a shift register coupled to said advancing pulse deriving means, a two-condition device coupled to said information and synchronizing pulse sources, said device having at least one stable condition and a monostable device coupled to said two-condition device, said two-condition device triggering from a first stable condition to a second condition in response to said information pulses and from the second to the first stable condition in response to said synchronizing pulses, said monostable device assuming an unstable condition in response to each triggering of said two-condition device from said first to said second condition creating an activating pulse of predetermined length, and means for applying said activating pulse to said first stage of said shift register, said monostable device being so timed in relation to said advancing pulse deriving means that the duration of said activating pulse overlaps and outlasts the duration of said advancing pulse derived from said corresponding synchronizing pulse, thus insuring the conditioning of said first stage of said register by said activating pulse after said advancing pulse has caused the number stored in said register to advance by one step, but preventing the said conditioning of said first stage prior to the occurrence of said associated advancing pulse.

2. An electronic circuit arrangement as claimed in claim 1 further including a delay circuit in series between said two-condition device and said source of synchronizing pulses, said two-condition device being triggered to its first stable condition through said delay circuit, thereby avoiding the production by said monostable device of an activating pulse prior to said first number stored on said register having been advanced by one step.

3. Delay circuit arrangement for producing a delayed train of pulses from an input train of pulses, comprising a source of an input train of pulses, a monostable device coupled to said source through a delay circuit so as to trigger to an unstable condition in delayed response to said pulses, said device being further coupled directly to said source so as to re-assume its original stable condition and generate an associated output pulse either in response to a successive pulse from said source, or at a predetermined time after said delayed triggering to said unstable condition, whichever occurs first.

References Cited in the file of this patent

UNITED STATES PATENTS

| | | |
|---|---|---|
| 2,605,403 | Crandon | July 29, 1952 |
| 2,776,418 | Townsend | Jan. 1, 1957 |
| 2,835,804 | Luther | May 20, 1958 |
| 2,847,566 | Metzger | Aug. 12, 1958 |
| 2,889,534 | Lubkin | June 2, 1959 |
| 2,907,003 | Hobbs | Sept. 29, 1959 |
| 2,977,574 | Pouliart et al. | Mar. 28, 1961 |